May 14, 1929.  M. J. HUGGINS  1,712,560
ELECTRIC INDICATING INSTRUMENT AND CASING THEREFOR
Filed Feb. 17, 1925
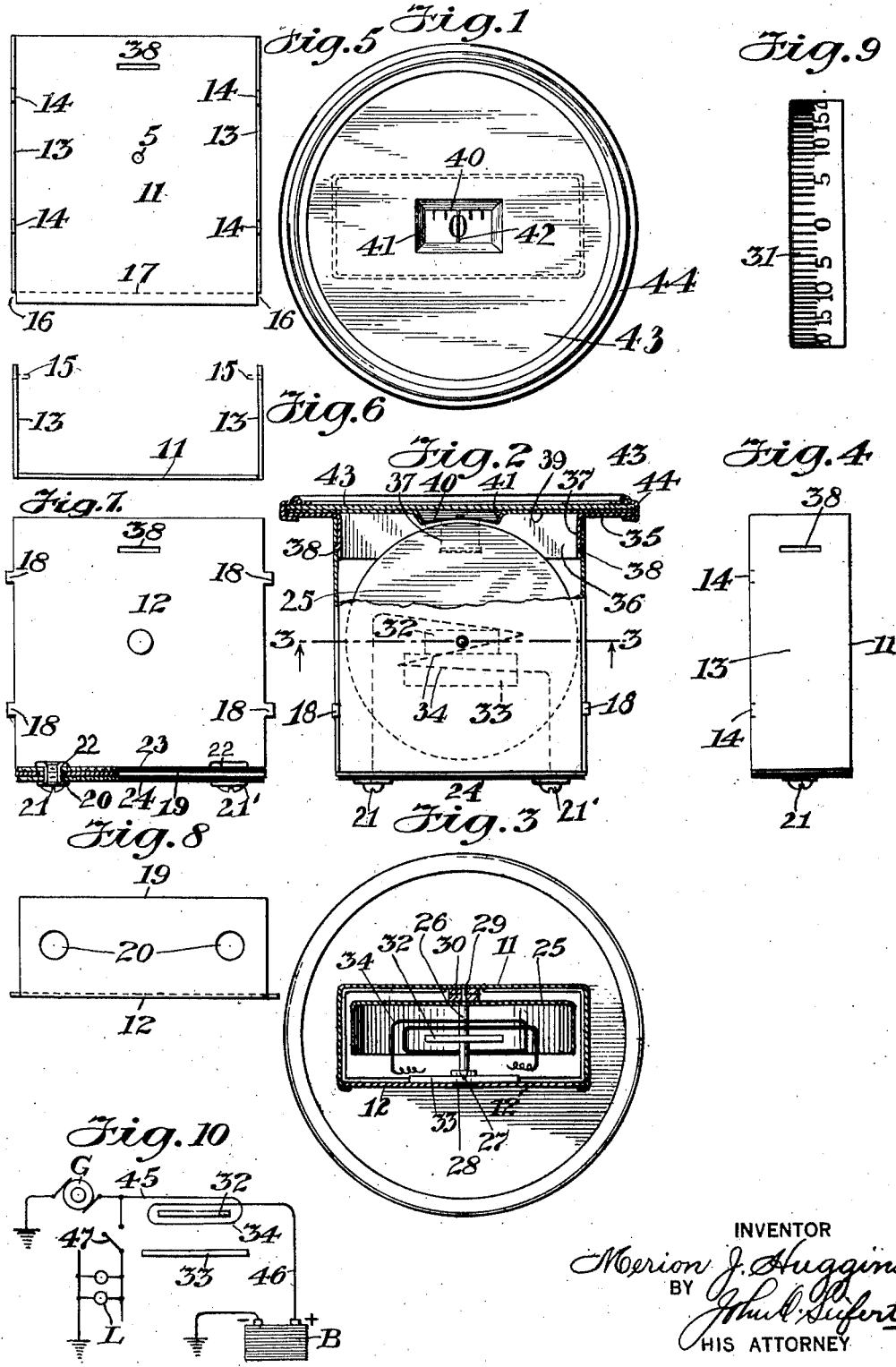

Patented May 14, 1929.

1,712,560

UNITED STATES PATENT OFFICE.

MERION J. HUGGINS, OF UPPER SADDLE RIVER, NEW JERSEY, ASSIGNOR TO AUTO-METER COMPANY, INC., OF NEW YORK, N. Y., A CORPORATION OF DELAWARE.

ELECTRIC INDICATING INSTRUMENT AND CASING THEREFOR.

Application filed February 17, 1925. Serial No. 9,847.

This invention relates to electric indicating means particularly adapted for use in connection with motor vehicles, although it may be utilized for other purposes. The invention may be adapted to serve as an ammeter to indicate the condition of the battery utilized in connection with the electric system of the vehicle, or it may be used as a measuring instrument to indicate the quantity of gasolene in the gasolene tank, the quantity of oil in the crank case, and the quantity of cooling medium in the radiator or the temperature of said cooling medium, and it is the primary object of the invention to provide an instrument for this purpose which is simple and compact in structure and efficient in use.

The present invention is an improvement upon the invention disclosed in my co-pending application Serial No. 690,175 wherein an indicator in the form of a pivotally supported pointer is movable relative to calibrations of a fixed dial and normally urged or set to zero position under the influence of a magnet upon a magnetizable element associated with the pointer, and the pointer is moved against such influence by a magnetic force generated by a coil connected in circuit with an electric source the strength of or the current flow of which is to be ascertained, or into which circuit external variable resistance is adapted to be connected and proportionally set up variations in the strength of the current flow and variations in a magnetic field generated by said current, in which magnetic field the pointer is located and influenced thereby to ascertain the condition of some apparatus.

In carrying out the present invention and as distinguished over the above referred to invention the indicator is moved and positioned by a pair of magnetic forces acting on an element associated with the indicator, which is preferably a magnetizable element although in certain instances this may comprise a polarized element, one of said magnetic forces being fixed and the other variable in accordance with variations in the current flow.

It is a further object of the invention to provide improved indicating means in instruments of this character comprising a rotatably supported dial in the form of a drum having calibrations or graduations arranged upon the periphery thereof and adapted to be read in connection with a fixed indicator or pointer positioned in relation to a window in the instrument carrying casing and whereby to provide a simple, cheap and compact construction and arrangement of parts.

It is another object of the invention to provide an improved construction and arrangement of indicator influencing means adapted for connection in circuit with the electric source the condition of which or the current flow thereof is to be ascertained whereby forces will not be set up which will interfere with a true and accurate reading of the condition which is to be determined by the current flow.

A further object of the invention is to provide an instrument of this character wherein the indicator serves as a shield to screen the indicating mechanism from derangement by magnetic and electromotive forces external of the instrument.

A further object of the invention relates to an improved constructed and arranged instrument carrying casing and mounting for the same.

Other objects and advantages will hereinafter appear.

In the drawing accompanying and forming a part of this specification Figure 1 is a front elevation of an electric indicating instrument embodying my invention.

Figure 2 is a side elevation, partly in section, to show the arrangement of the indicator means and the mounting of the instrument.

Figure 3 is a cross sectional view taken substantially on the line 3—3 of Figure 2 looking in the direction of the arrows.

Figure 4 is a side elevation of the instrument carrying casing.

Figure 5 is a side elevation of one member of the casing.

Figure 6 is an end elevation of the casing member shown in Figure 5.

Figure 7 is a side elevation of another member of the casing.

Figure 8 is an end elevation of the casing member shown in Figure 7.

Figure 9 is a plan view of a scale for arrangement on the periphery of the indicator drum; and Figure 10 is a diagrammatic view to show the electric hook up of my improved instrument in connection with the electrical system of a motor vehicle.

Similar characters of reference designate like parts throughout the different views of the drawing.

In carrying out the embodiment of the invention illustrated in the drawing the operative mechanism of the instrument is mounted in an open end casing preferably of non-magnetizable material, such as brass, constructed of a pair of plates 11 and 12 to constitute the side walls of the casing. The opposite marginal side portions of the plate 11 are flanged to extend at right angles to the body of the plate, as at 13, said flanges being arranged with recesses 14 in the edge thereof, and the marginal portions of the flanges having the recesses are adapted to be bent to extend at right angles thereto, as shown in dotted lines at 15 in Figure 6. The one end of the plate, to constitute the bottom end, has portions cut from the corners, as at 16, and the remaining portion is bent at a right angle to the body of the plate, as on the dotted line 17, to engage within the side flanges 13 for a purpose to be hereinafter described. The other plate 12 is arranged with tangs 18 to extend laterally from the side edges; the one end of the plate, to constitute the bottom end, is flanged to extend at a right angle to the body of the plate, as at 19 (Figure 8). The plate 12 is of a width to engage within the flanges 13 of plate 11. In assembling the casing plates the plate 12 is adjusted relative to the plate 11 with the tangs 18 engaged in the flange recesses 14, with the flange 19 of plate 12 engaging between the flanges 13 of plate 11. In this condition the bottom end of plate 11 is folded against the plate flange 19 and the marginal portion of the plate flanges 14 are folded as shown in dotted lines 15 over the plate 12 and the tangs 18 of plate 12 folded against the flanges 13 of plate 11. The plate 19 is provided with perforations 20, in the present instance shown as two in number, for the mounting of electric terminal contacts 21, 21' in insulated relation thereto, which contacts are in the nature of binding posts. These contact terminals are in the form of eyelets 22, the body of which is of less diameter than the perforations 20. These contacts are insulated from the casing flange by plates of insulating material 23, 24 arranged at opposite sides of the flange having perforations for the passage of the eyelets and of substantially the same diameter and held in position by the clenching of the eyelets, this clenching of the eyelets causing a part of the insulator plates to be squeezed in interposed relation to the eyelets and the wall of the flange perforations, thereby effectively insulating the eyelets from the plate.

An index dial or indicator drum in the form of a cup shaped member 25 is rotatably mounted in the casing by means of a pintle 26 having a bearing support, as at 27, in a bearing member 28 arranged in the plate 12, and the opposite end rotatably engaging in a perforation in the plate 11. The drum is fixed to the pintle by reducing one end thereof, as at 29, and engaging said reduced end in a perforation axially of the drum and clamping the drum between the shoulder formed by the reduced end and washers or nuts 30 engaged on said reduced end at the outer side of the drum, said washers or nuts being interposed between the casing member 11 and the drum holding the pintle against axial movement. The pintle bearing 28 is adjustable as by screw threading into the plate 12 to take up axial play in the pintle. The drum is arranged on the periphery with suitable calibrations or graduations as by engraving directly upon the drum, or by printing the same upon a strip of paper or celluloid 31 (Figure 9) and attaching the same to the periphery of the drum as by an adhesive or riveting. As stated, the instrument is adapted to serve as an ammeter to indicate the condition of an electric current flow, in which case the calibrations are arranged with indices indicative of amperes reading from zero located centrally between the ends of the strip and reading in multiples of five to the oposite ends of the strip. When utilized as an instrument for measuring the quantity of liquid in a tank the indices are arranged to read from end to end of the strip, the calibrations being arranged to indicate quantity by the liquid level in the tank or in gallons.

The drum is normally set in predetermined position by magnetic means comprising a bar of magnetizable material 32, although in some instances this may preferably be a bar of polarized material, mounted upon the pintle intermediate the ends thereof to participate in the movement of the pintle, and arranged substantially midway between the ends of the pintle. A bar 33 of polarized material, such as a permanent magnet, and having greater bulk than the bar 32 is fixed to the casing plate 12 to extend transversely of the pintle and in contiguous relation thereto with the pintle arranged substantially midway between the ends of the bar. The magnetic flux of the magnet bar 33 acts upon the bar 32 to position the latter in parallel relation to the bar 33. By the arrangement of the magnet bar at one side of the pintle and offset from the bar 32 the pull of the magnet on the bar 32 will hold the drum gainst vibratory movement due to jars or the like when utilizing the instrument in connection with motor vehicles.

The indicator drum is actuated to indicate the condition of a current flow by a variable magnetic force generated by the current flow acting on the magnetizable or polarized element 32 against the magnetic force of the magnet 33 on said element. For this purpose there is provided an element having preferably a low resistance to the current flow in the form of a coil of coarse wire 34 and in the magnetic field or flux of which coil the element 32 is located, as clearly shown in Figure 3. One terminal of the current coil is electrically connected with a contact terminal, as 21, while the other terminal of such element is connected with the contact terminal 21'.

The flanges of the drum 25 are of a size to substantially extend about the magnetic force generating means and constructed of a material, tinned sheet iron or steel having been found to answer the purpose, to serve as a shield to screen the magnetic force generating means from being affected by magnetic or electromotive forces external of the instrument.

The casing plate 12 is in the nature of a mounting plate upon which the operative mechanism of the instrument is mounted when said plate and the plate 11 are assembled to form the enclosing casing.

The open end of the casing is arranged with a closure and mounting member comprising a plate 35 arranged with an opening substantially of the same area as the area of the casing opening with the marginal portions of the plate extending beyond the ends and sides of the casing. The plate 35 is provided with flanges 36 about the opening, which may consist of the material stamped from the plate to form the opening therein. These flanges are adapted to be engaged within the casing to serve as a mounting and support for the casing. Portions of the flanges are arranged as resilient tongues 37 stamped therefrom, and sprung to normally extend slightly laterally of the tongues, the free ends of the tongues being arranged with lips to engage in openings 38 in the opposite end and side walls of the casing. To mount the casing upon the flanges 36 of plate 35 the casing is tilted to one side relative to the plate flanges 36 when the tongues of the opposite end flanges and the one side flange of the plate are pressed inward and the casing engaged over the plate flanges, and as the casing is moved to position with the end in abutting relation to the plate the casing openings 38 will be in position for the tongue lips to engage therein.

A second plate 39, which is herein termed an indicator plate, is juxtaposed to the mounting plate 35, said plate being arranged with a sight opening or window 40 substantially midway between the ends of the casing opening through which to observe the calibrations on the indicator drum, the marginal portions of said opening 40 being flanged inward to lie adjacent to the periphery of the drum, as shown at 41, to facilitate the reading of the indicator calibrations. A thin rib 42 is arranged midway between the ends of the opening 40 to serve as an index or pointer. To close the indicator opening 40 a plate 43 of transparent material, such as glass or celluloid, is juxtaposed to and is of a size substantially the same as the plate 39. The plates 35, 39 and 43 are united into a unitary structure by a bezel 44.

By the arrangement of the mounting plate and connection of the instrument thereto, and by the arrangement of the folding of the marginal portions of the casing plate 11 over the casing plate 12 a substantially dust and moisture tight casing is provided for the operative mechanism of the instrument.

In Figure 10 I have illustrated in a diagrammatic manner the electrical hook up of the instrument with the electric system of a motor vehicle to indicate whether the electric energy is being discharged from the source of current supply, comprising a storage battery B, or said battery is being charged through the operation of a generator, indicated in a conventional manner at G. One terminal of the current coil 34 is connected by a lead 45 in circuit with the generator, the other terminal of the coil being connected by a lead 46 with the battery, the generator and battery being connected as by grounding in the vehicle frame, as shown. The electric translating devices of the vehicle, shown in a conventional manner as comprising lamps L, are connected in the circuit by connecting to the lead 45 and grounding as in the vehicle frame, the connection of said devices in the circuit having a switch 47 interposed therein.

Having thus described my invention, I claim:

1. In an electric indicating instrument, a rotatable indicator, a magnetizable element rotatable therewith, a fixed polarized element under the influence of which element the magnetizable element with the indicator is moved to a predetermined position, and magnetic force generating means under the influence of which the magnetizable element with the indicator is adapted to be moved variable distances against the force of the polarized element exerted on the magnetizable element.

2. In an electric indicating instrument, a polarized element and a magnetizable element one of which is fixed and the other movable and the movable element moved to a predetermined position under the influence of the polarized element on the magnetizable element, a drum arranged with calibrations upon the periphery associated with the movable element to move in unison therewith, and magnetic force generating means under the influence of which means upon the magnetizable element the drum is moved against the influence of the polarized element on the magnetizable element.

3. An electric indicating instrument in accordance with claim 2, wherein the drum is constructed and arranged to serve as a shield to surround and screen the magnetic drum actuating means from magnetic forces external to the instrument.

4. In an indicating instrument, a rotatable cylindrical drum arranged with calibrations upon the periphery, magnetic means to urge said drum to and set the same in predetermined position, and electromagnetic means arranged for connection in an electric circuit operative to move the cylindrical drum variable distances against the force tending to set it in predetermined position an amount proportional to the variations in the current flow in the circuit.

5. In an electric indicating instrument, a casing having an opening, a cylindrical member rotatably mounted in the casing arranged with calibrations upon the periphery and a closure member for the opening in said casing having an opening to expose a peripheral portion of the cylindrical member therethrough with the marginal portion of the opening flanged inward to lie adjacent to the periphery of the cylindrical member, magnetic means to urge said member to and set the same with the calibrations in predetermined position relative to the opening in the closure member, and electromagnetic means in the casing arranged for connection in an electric circuit operative to move the cylindrical member against the force tending to set it in predetermined position variable distances proportional to variations in the current flow in the circuit.

6. In an electric indicating instrument carrying casing, a pair of plates constituting opposite sides of the casing, the plates having flanges constituting end walls of the casing with one end open and arranged with co-operating means securing the plates together, and a closure member for the open end of the casing arranged with an opening having the marginal portions flanged to extend into the casing and arranged for mounting the casing upon a support.

7. In an electric indicating instrument carrying casing, a pair of plates constituting the sides of the casing, the plates flanged constituting end walls of the casing with one end open and arranged with co-operating means to secure them together, and a closure member for the opening in the casing arranged with laterally extending resilient tongues for the releasable engagement of the casing, and an opening centrally thereof with the material stamped from the closure member to form the opening flanged into the casing and arranged to extend around the marginal portion of the opening.

8. In an electric indicating instrument carrying casing, an open end casing comprising a pair of plates constituting the sides of the casing, and the plates having flanges constituting the end walls of the casing, and arranged to be secured together, and a closure and mounting member for the open end of the casing, including a plate having an opening with a flange about the opening to engage in and support the casing, and portions of the flange arranged as resilient tongues for engagement with the casing to releasably secure the casing to the flanges, and a second plate juxtaposed to the first plate having a central opening with the marginal portion of the wall thereof flanged in a direction to extend into the casing.

9. In an electric indicating instrument carrying casing, an open end casing comprising a pair of plates constituting the sides of the casing, one plate having an end flanged and the other having the opposite sides flanged, said flanges constituting the end walls of the casing and arranged to be secured together, and a closure and mounting member for the open end of the casing, including a plate having an opening with a flange about the opening to engage in and support the casing, and portions of the flange arranged as resilient tongues for engagement with the casing to releasably secure the casing to the flanges, a second plate juxtaposed to the first plate having a central opening with the marginal portion of the wall thereof flanged in a direction to extend into the casing, a transparent plate juxtaposed to the second plate, and a bezel to bind the plates in a unitary structure.

10. In an electric indicating instrument, a rotatable dial having circularly arranged calibrations thereon, a fixed polarized element extending transversely of the dial, a magnetizable element intersecting the axis of, and rotatable with the dial normally positioned under the influence of the polarized element in parallel relation thereto with the dial in a predetermined position, and a magnetic field generating coil surrounding the magnetizable element to influence and move the magnetizable element with the dial against the influence of the polarized element.

11. In an electric indicating instrument, a casing, a drum arranged with calibrations upon the periphery thereof, a pintle upon which the drum is fixed rotatably mounted in the casing with the peripheral portion of the drum exposed through an opening in the casing, a bar of polarized material fixed in the casing to extend transversely of the drum, a bar of magnetizable material mounted intermediate the ends thereof on the pintle in spaced relation to the polarized bar, said magnetizable element being adapted to be urged to position under the influence of the polarized bar to extend in parallel relation thereto with the drum in a predetermined position therewith, and means to magnetically influence and move the magnetizable bar with the drum against the influence of the polarized bar thereon.

12. In an electric indicating instrument, a casing, a drum arranged with calibrations upon the periphery thereof, a pintle upon which the drum is fixed rotatably mounted in the casing with the peripheral portion of the drum exposed through an opening in the casing, a bar of polarized material fixed in the casing to extend transversely of the drum at one side of the drum pintle, a bar of magnetizable material mounted intermediate the ends thereof on the pintle, said magnetizable element being adapted to be set under the influence of the polarized bar to extend in parallel relation thereto with the drum in a predetermined position, and a coil of low electric resistance material embracing the magnetizable element, and means arranged for connection in an electric circuit and to which the terminals of the coil are connected, said magnetizable element under the influence of the magnetic field generated by said coil being adapted to be moved with the drum variable distances against the influence of the polarized bar thereon.

13. In an electric indicating instrument, a casing having an opening therein, a cylindrical member arranged with calibrations upon the periphery rotatably mounted in the casing, a closure member for the opening in said casing having an opening to expose a peripheral portion of the cylindrical member therethrough the marginal portion of said opening being flanged inward to lie adjacent to the periphery of the cylindrical member, means including a polarized element and a magnetizable element influenced by the polarized element to urge said cylindrical member to predetermined position, and electric current actuated means arranged for connection in an electric circuit to act on and move the magnetizable element with the cylindrical member against the influence of the polarized element to variably position the cylindrical member against the influence of the polarized element proportional to variations in the current flow in circuit with said means.

Signed at New York city, in the county of New York and State of New York, this 23rd day of January, 1925.

MERION J. HUGGINS.